United States Patent
Pascoguin et al.

(10) Patent No.: US 12,327,542 B2
(45) Date of Patent: Jun. 10, 2025

(54) HIGH ACOUSTIC-AMPLITUDE LASER-INDUCED PLASMA (LIP) SOUND GENERATOR

(71) Applicant: United States of America as represented by the Secretary of the Navy, San Diego, CA (US)

(72) Inventors: Bienvenido Melvin L. Pascoguin, San Diego, CA (US); Brittany Lynn, San Diego, CA (US); Michael P. Ross, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 383 days.

(21) Appl. No.: 18/168,735

(22) Filed: Feb. 14, 2023

(65) Prior Publication Data
US 2024/0274118 A1    Aug. 15, 2024

(51) Int. Cl.
*G10K 15/04* (2006.01)
*H01S 3/00* (2006.01)
*H04R 23/00* (2006.01)

(52) U.S. Cl.
CPC .......... *G10K 15/046* (2013.01); *H01S 3/0057* (2013.01); *H01S 3/0085* (2013.01); *H04R 23/008* (2013.01)

(58) Field of Classification Search
CPC ... G10K 15/046; H01S 3/0057; H01S 3/0085; H04R 23/008
See application file for complete search history.

(56) References Cited

U.S. PATENT DOCUMENTS

2019/0120219 A1 * 4/2019 Calomeris ............ H05H 1/2406

FOREIGN PATENT DOCUMENTS

DE    102023203086 A1 * 10/2024 .............. B22F 10/28

OTHER PUBLICATIONS

Pablo Purohit, Materials Characterization by Laser-Induced Plasma Acoustics and Spectroscopy, Dec. 13, 2022, Springer Nature Link, pp. 283-313 (Year: 2022).*
Jakub Buday, Investigating the Evolution of Laser Induced Plasmas by Complementary Optical and Spectroscopic Methods, https://theses.cz/id/wjj2fy/Disertation_Buday.pdf, (Year: 2024).*
Jeffrey A. Davis, Ignacio Moreno, José Luis Martínez, Travis J. Hernandez, and Don M. Cottrell, "Creating three-dimensional lattice patterns using programmable Dammann gratings," Appl. Opt. 50, 3653-3657 (2011).

(Continued)

*Primary Examiner* — Francis C Gray
(74) *Attorney, Agent, or Firm* — Naval Information Warfare Center Pacific; Kyle Eppele; J. Eric Anderson

(57) ABSTRACT

A laser-induced plasma (LIP) sound generator comprising: a laser beam and a first beam splitter configured to split the laser into a plurality of sub-laser beams such that each sub-laser beam creates a LIP at a respective focal point, wherein each focal point lies within an imaginary sphere having a radius that is less than half of a desired sound wavelength such that acoustic fields of the LIPs add together as if from a single point source.

17 Claims, 5 Drawing Sheets

(56) References Cited

OTHER PUBLICATIONS

Bandres, Miguel A and Julio C. Gutiérrez-Vega, "Ince-Gaussian modes of the paraxial wave equation and stable resonators." Journal of the Optical Society of America. A, Optics, image science, and vision 21 5 (2004).
Hugo Sobral, Mayo Villagran-Muniz, Rafael Navarro-Gonzalex, and Alejandro C. Raga. "Temporal evolution of the shock wave and hot core air in laser induced plasma." Appl. Phys. Lett. 77, 3158 (2000).
Ciprian Dumitrache, Christopher M. Limbach, and Azer P. Yalin. "Threshold characteristics of ultraviolet and near infrared nanosecond laser induced plasmas." Physics of Plamas. 23, 093515 (2016).
Jeffrey A. Davis, B. Melvin L. Pascoguin, C. Stewart Tuvey, and Don M. Cottrell. "Fourier transform pupil functions for modifying the depth of focus of optical imaging systems." Applied Optics. 48, 26 (2009).
Jeffrey A. Davis, Don M. Cottrell, Juan Campos, Maria J. Yzuel, and Ignacio Moreno. "Encoding amplitude information onto phase-only filters." Applied Optics. 38, 23 (1999).
South, Todd; "Pentagon scientists are making talking plasma laser balls for use as non-lethal weapons"; Military Times; available online at https://www.militarytimes.com/news/your-military/2019/07/19/pentagon-scientists-are-making-talking-plasma-laser-balls-for-use-as-non-lethal-weapons/; Jul. 19, 2019.

* cited by examiner

HIGH ACOUSTIC-AMPLITUDE LASER-INDUCED PLASMA (LIP) SOUND GENERATOR

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 111956.

BACKGROUND OF THE INVENTION

This invention relates to the field inventions that rely on laser-induced plasma (LIP) effects. Previously, scientists have found that a LIP can be modulated to produce audible sound. The current method of increasing the sound emission is by simply increasing the laser energy. There is a need to increase the acoustic amplitude of sound emissions generated by LIPs.

SUMMARY

Described herein is a LIP sound generator that comprises, consists of, or consists essentially of a laser beam and a first beam splitter. The first beam splitter is configured to split the laser into a plurality of sub-laser beams such that each sub-laser beam creates a LIP at a respective focal point. Each focal point lies within an imaginary sphere having a radius that is less than half of a desired sound wavelength such that acoustic fields of the LIPs add together as if from a single point source as heard by a listener.

Also disclosed herein is a method for generating high-amplitude acoustic energy from LIPs comprising the following steps. The first step provides for generating a plurality of laser beams. Each laser beam is configured to generate a LIP at a respective focal point such that acoustic energy is generated by each LIP. The next step provides for focusing each of the plurality of laser beams such that each focal point lies within an imaginary sphere having a radius that is less than half of a desired sound wavelength such that the acoustic energy generated by each LIP is added together as if from a single point source.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figures 1A, 1B:
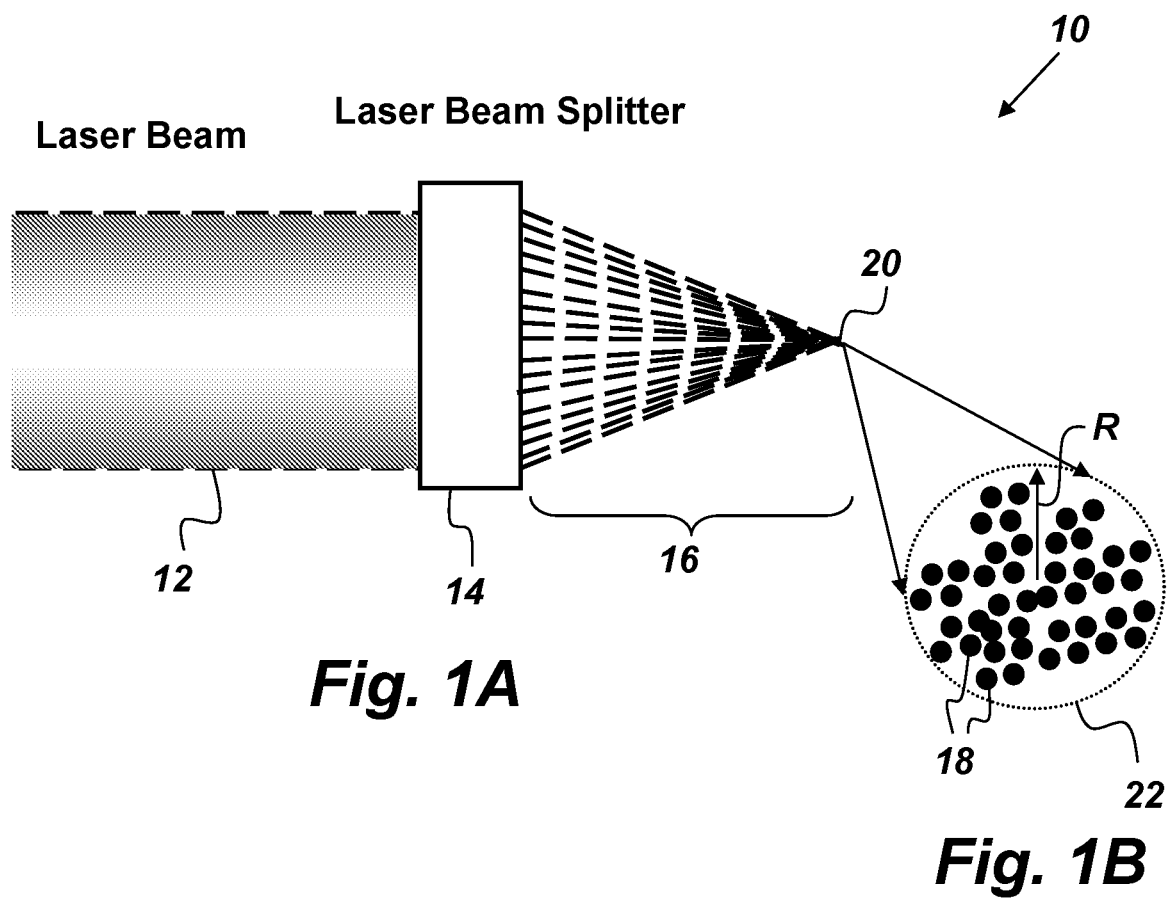
FIG. 1A is a side-view illustration of an embodiment of a LIP sound generator.
FIG. 1B is a cross-sectional view of a sphere containing LIPs.

FIG. 1A is a side-view illustration of an embodiment of a LIP sound generator 10 that comprises, consists of, or consists essentially of a laser beam 12 and a first beam splitter 14. The first beam splitter 14 is configured to split the laser 12 into a plurality of sub-laser beams 16 such that each sub-laser beam 16 creates a LIP 18 at a respective focal point 20. Each focal point 20 lies within an imaginary sphere 22 having a radius R that is less than half of a desired sound wavelength such that acoustic fields of the LIPs 18 add together as if from a single point source as heard by a listener. FIG. 1B is a cross-sectional view of the sphere 22 and the LIPs 18 created at each respective focal point 20 of each sub-laser beam 16. Above a certain threshold of laser energy, further increases in LIP sound output are limited. By splitting the laser beam 12 to make multiple LIPs, each generated from laser intensities that may be below the threshold, the sound generated by the individual LIPs will superpose as if from one point source as long as the LIPs are created within a sphere much smaller (i.e., less than half) than a desired sound wavelength.

Saturation of acoustic energy occurs above the certain threshold (which may be expressed in terms of laser energy) where the acoustic energy increases only logarithmically with increased laser energy. Generating multiple LIPs enables more efficient sound amplification beyond what can be achieved by merely increasing the laser energy of a single laser. To obtain amplification that retains the characteristics of an acoustic point source, it is desirable for the LIPs to be located close together (i.e., within the sphere 22). Otherwise, as the LIP separation gets larger, the far field sound wave propagation becomes diffractive, and this leads to acoustic frequency shifts and non-uniform acoustic amplitudes. Free space sound behaves as a wave phenomenon, and since the size of the initial acoustic disturbance from each LIP is on the order of hundreds of microns to millimeters and audible acoustic wavelengths range from centimeters to tens of meters, each LIP is effectively a point source of sound. To make multiple sound point sources indistinguishable from each other and effectively add them together as a single source, the sources may be positioned near each other within a fraction of the desired sound wavelength.

Figure 5:
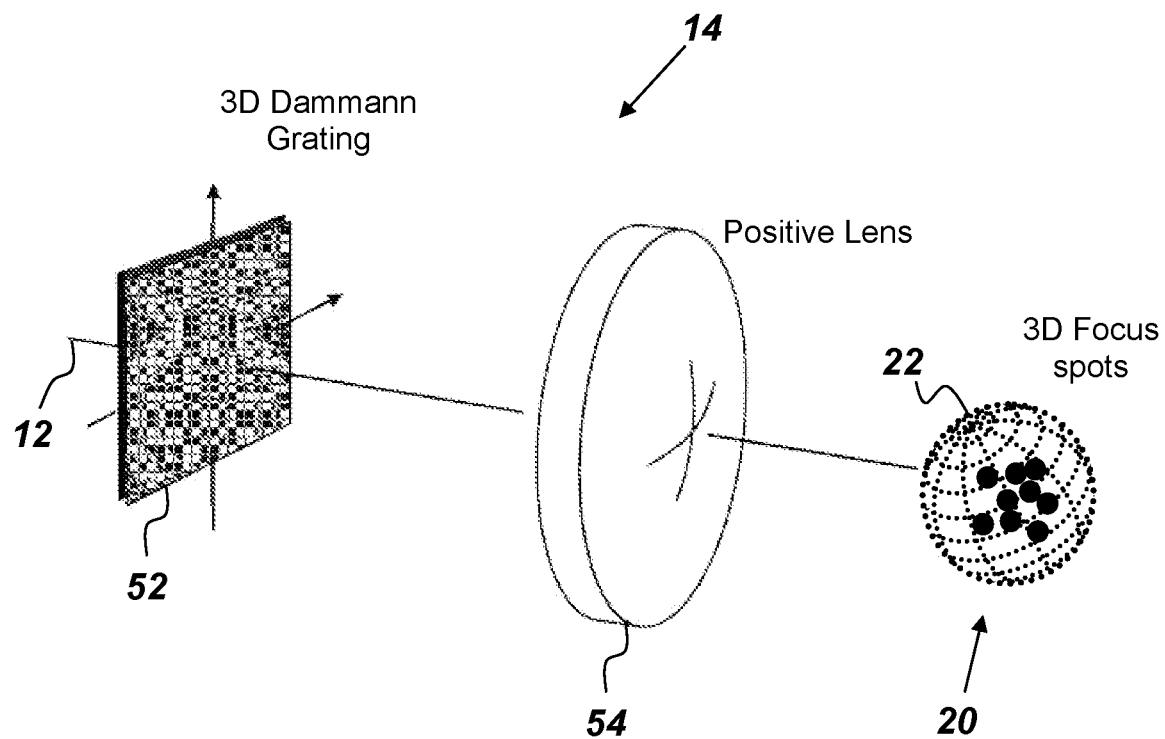
FIG. 5 is a perspective-view illustration of an embodiment of a LIP sound generator.

The laser beam 12 may be any laser capable of generating a plasma. The plasma may be generated at the focal point in air or any other medium capable of supporting LIP generation. The first beam splitter 14 may be any device capable of splitting the laser beam 12 into sub-laser beams 16. A suitable example the first beam splitter 14 is, but is not limited to, a spatial light modulator configured to split the laser beam via diffraction, such as is shown in FIG. 5. The multiple LIPs may be generated by a single laser beam that is split into sub-laser beams or by several separate laser sources, provided all the foci lie within the sphere 22.

Figure 2:
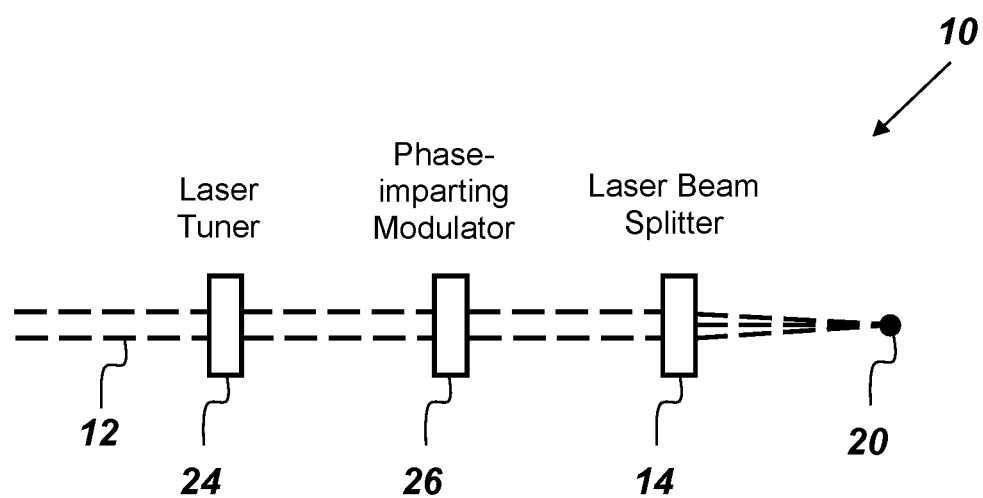
FIG. 2 is a side-view illustration of an embodiment of a LIP sound generator.

FIG. 2 is a side-view illustration of an embodiment of the LIP sound generator 10, which further comprises a laser tuner 24 configured to tune the laser beam 12 between natural laser modes that non-uniformly distribute laser energy, such as Ince-Gaussian modes. These modes are stable in resonators, so a laser may be tuned to achieve different modes thereby changing the resulting sound volume of the LIPs. Each natural laser mode may correspond to a different acoustic volume level of the acoustic fields produced by the LIPs. This embodiment also comprises a modulator 26 (e.g., electro-optic modulator (EOM) or acousto-optic modulator (AOM)) configured to impart phase information to the laser beam 12 to allow separation of the focal points 20 of the sub-laser beams 16. The modulator 26 may be configured to employ phase-only beam modulation to avoid absorption inherent in amplitude modulation. Absorption may lead to damage of the EOM/AOM material due to high incident laser power.

Figure 3A:
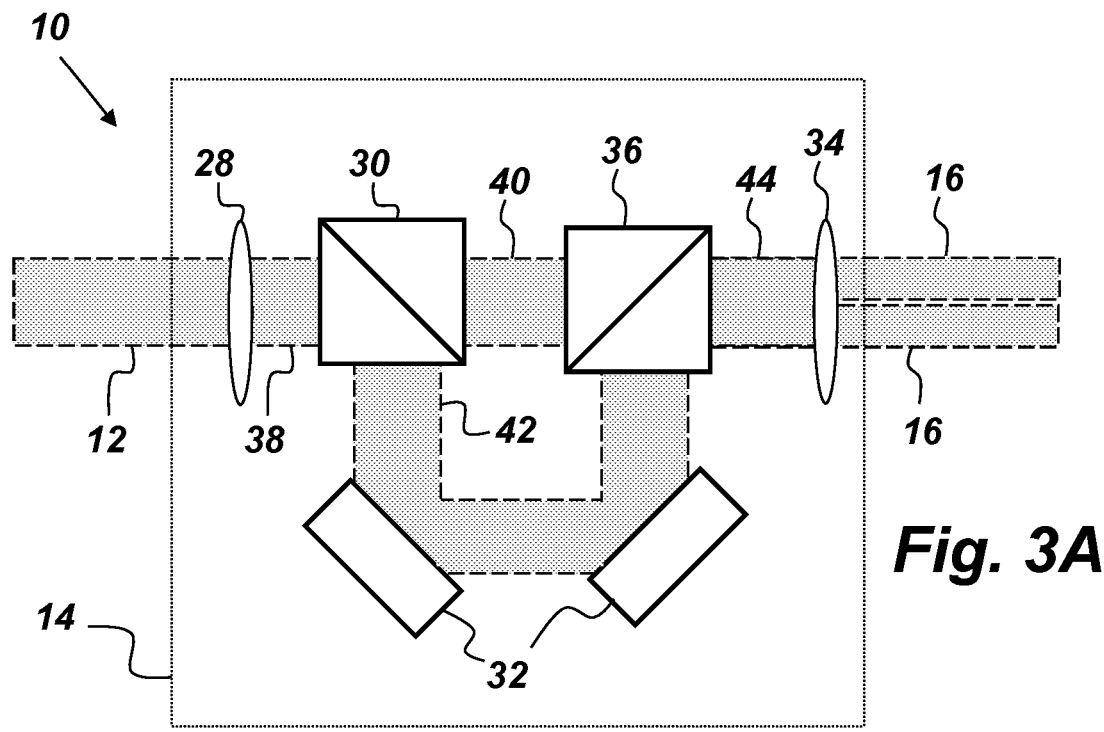
FIG. 3A is a schematic of an embodiment of a LIP sound generator.

FIG. 3A is a schematic of an embodiment of the LIP sound generator 10 where the first beam splitter 14 comprises, consists of, or consists essentially of, a first half-wave plate 28, a first polarizing beam splitter 30, two mirrors 32, a second half-wave plate 34, and a second polarizing beam splitter 36. In this embodiment, the laser beam 12 is split into two sub-laser beams 16 and adds a slight misalignment when the sub-laser beams are recombined to nearly co-linear propagation. This slight misalignment shifts the focus of one LIP 18 away from the other LIP 18. Therefore, even if the total laser energy is above the saturation threshold, the sound will be amplified as if from a single source. The first half-wave plate 28 is configured to rotate a plane of polarization of the laser beam 12 to create a rotated beam 38. The first polarizing beam splitter 30 is configured to split the rotated beam 38 into a first sub-laser beam 40 and a second sub-laser beam 42. The set of mirrors 32 is configured to impart a phase shift to the second sub-laser beam 42 with respect to the first sub-laser beam 40. The second polarizing beam splitter 36 is configured to combine the first sub-laser beam 40 and the phase-shifted second sub-laser beam 42 into a combined beam 44. The second half-wave plate 34 is configured to rotate the plane of polarization of the combined beam 44 to create the plurality of sub-laser beams 16. As a result, the respective focal points 20 (as shown in FIG. 1B) of the sub-laser beams 16 are slightly misaligned.

Figure 3B:
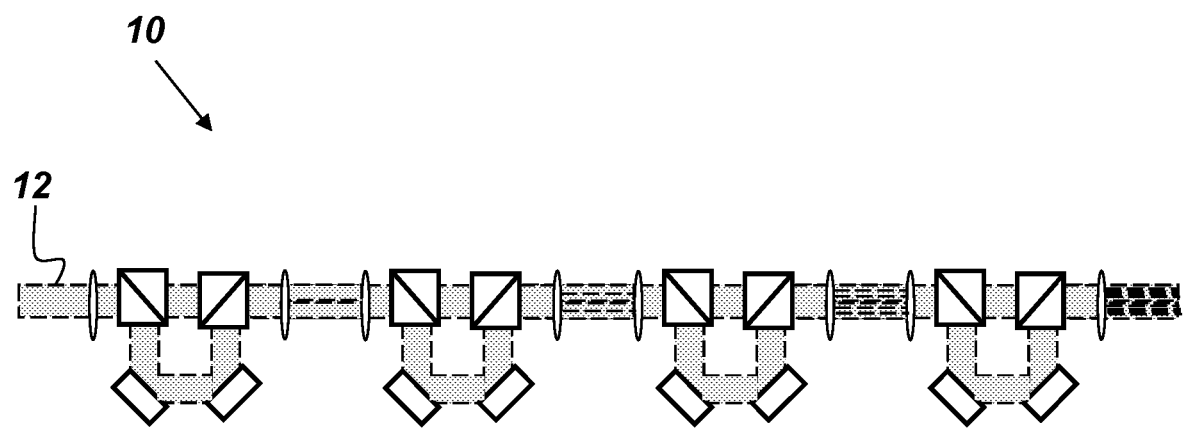
FIG. 3B is a side-view illustration of an embodiment of a LIP sound generator.

FIG. 3B is an illustration of another embodiment of the LIP sound generator 10 comprising second, third, and fourth beam splitters 46, 48, and 50 respectively. The second, third, and fourth beam splitters 46, 48, and 50 are connected together in series and each has the same structure as the first beam splitter 14 shown in FIG. 3A. To further increase the laser energy to generate louder and louder sound, n number of beam splitters may be connected together in series as shown in FIG. 3B to produce $2^n$ LIP. Embodiments of the LIP sound generator 10, such as shown in FIGS. 1A, 2, 3A, and 3B maintain the full aperture size of the laser beam 12, supporting higher energy densities at the focus than a beam that has been sub-apertured in order to achieve this effect.

Figure 4:
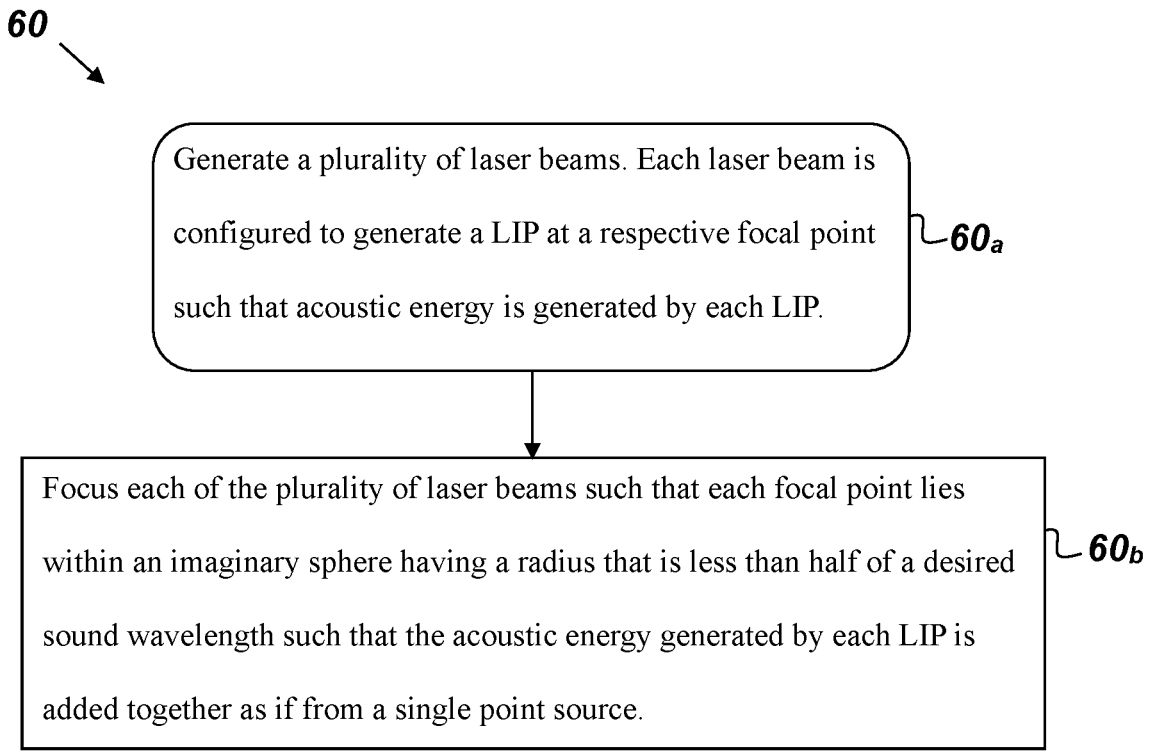
FIG. 4 is a flowchart.

FIG. 4 is a flowchart of a method 60 for generating high-amplitude acoustic energy from LIPs comprising the following steps. The first step $60_a$ provides for generating a plurality of laser beams. Each laser beam is configured to generate a LIP at a respective focal point such that acoustic energy is generated by each LIP. The next step $60_b$ provides for focusing each of the plurality of laser beams such that each focal point lies within an imaginary sphere having a radius that is less than half of a desired sound wavelength such that the acoustic energy generated by each LIP is added together as if from a single point source. A first beam splitter may be used to split an initial laser beam into a plurality of sub-laser beams such that each sub-laser beam creates a LIP at a respective focal point within the imaginary sphere.

FIG. 5 is a perspective-view illustration of an embodiment of the LIP sound generator 10, where the beam splitter 14 is a spatial light modulator (SLM) configured to split the laser beam 12 via diffraction. In this embodiment, the first beam splitter 14 is a three dimensional array using a Dammann grating 52 and a positive lens 54.

From the above description of the LIP sound generator 10 and the method for using LIPs to generate high-amplitude acoustic energy, it is manifest that various techniques may be used for implementing the concepts thereof without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the LIP sound generator 10 and the method 60 for using LIPs to generate high-amplitude acoustic energy are not limited to the particular embodiments described herein, but is capable of many embodiments without departing from the scope of the claims.

We claim:

1. A laser-induced plasma (LIP) sound generator comprising:
   a laser beam;
   a first beam splitter configured to split the laser into a plurality of sub-laser beams such that each sub-laser beam creates a LIP at a respective focal point, wherein each focal point lies within an imaginary sphere having a radius that is less than half of a desired sound wavelength such that acoustic fields of the LIPs add together as if from a single point source.

2. The LIP sound generator of claim 1, wherein the first beam splitter comprises spatial light modulators configured to split the laser beam via diffraction.

3. The LIP sound generator of claim 1, further comprising a laser tuner configured to tune the laser beam between natural laser modes that non-uniformly distribute laser energy, wherein each natural laser mode corresponds to a different volume level of the acoustic fields.

4. The LIP sound generator of claim 1, further comprising an electro-optic modulator (EOM) or acousto-optic modulator (AOM) configured to impart phase information to the laser beam to allow separation of the focal points.

5. The LIP sound generator of claim 4, wherein the EOM or AOM employs phase-only beam modulation to avoid absorption inherent in amplitude modulation.

6. The LIP sound generator of claim 1, wherein the first beam splitter comprises:
   a first half-wave plate configured to rotate a plane of polarization of the laser beam to create a rotated beam;
   a first polarizing beam splitter configured to split the rotated beam into a first sub-laser beam and a second sub-laser beam;
   a set of mirrors configured to impart a phase shift to the second sub-laser beam;
   a second polarizing beam splitter configured to combine the first sub-laser beam and the phase-shifted second sub-laser beam into a combined beam;
   a second half-wave plate configured to rotate the combined beam's plane of polarization to create the plurality of sub-laser beams, wherein the respective focal points are misaligned.

7. The LIP sound generator of claim 6, further comprising at least one additional beam splitter configured to receive the plurality of sub-laser beams from the first beam splitter, wherein the at least one additional beam splitter has the same structure as the first beam splitter.

8. The LIP sound generator of claim 1, wherein the first beam splitter utilized a full aperture size of the laser beam.

9. The LIP sound generator of claim 1, wherein each sub-laser beam creates a LIP in air.

10. A method for generating high-amplitude acoustic energy from laser-induced plasma (LIP) comprising:
    generating a plurality of laser beams, wherein each laser beam is configured to generate a LIP at a respective focal point such that acoustic energy is generated by each LIP; and
    focusing each of the plurality of laser beams such that each focal point lies within an imaginary sphere having a radius that is less than half of a desired sound wavelength such that the acoustic energy generated by each LIP is added together as if from a single point source.

11. The high-amplitude LIP acoustic energy generation method of claim 10, wherein the step of generating the plurality of laser beams comprises using a first beam splitter to split an initial laser beam into a plurality of sub-laser beams such that each sub-laser beam creates a LIP at a respective focal point within the imaginary sphere.

12. The high-amplitude LIP acoustic energy generation method of claim 11, wherein the first beam splitter comprises spatial light modulators configured to split the initial laser beam via diffraction.

13. The high-amplitude LIP acoustic energy generation method of claim 10, wherein the plurality of laser beams are generated by at least two separate laser sources.

14. The high-amplitude LIP acoustic energy generation method of claim 10, further comprising altering a natural mode of the plurality of laser beams in order to alter an acoustic amplitude level of the total LIP-generated acoustic energy.

15. The high-amplitude LIP acoustic energy generation method of claim 10, wherein the LIPs are generated in air.

16. The high-amplitude LIP acoustic energy generation method of claim 11, further comprising:
    rotating a plane of polarization of the initial laser beam with a first half-wave plate to create a rotated beam;
    splitting the rotated beam into a first sub-laser beam and a second sub-laser beam with a first polarizing beam splitter;
    imparting a phase shift to the second sub-laser beam with a set of mirrors such that the respective phases of the first and second sub-laser beams are misaligned;
    combining the first sub-laser beam and the phase-shifted second sub-laser beam into a combined beam with a second polarizing beam splitter;
    rotating the combined beam's plane of polarization to create the plurality of sub-laser beams with a second half-wave plate, wherein the respective focal points are not identical but still lie within the imaginary sphere.

17. The high-amplitude LIP acoustic energy generation method of claim 16, further comprising:
    further splitting the plurality of sub-laser beams from the first beam splitter with a second beam splitter.

* * * * *